United States Patent Office 3,435,056
Patented Mar. 25, 1969

3,435,056
HALOGENATED CYCLOPROPYL AND CYCLO-PROPENYL STEROIDS AND PROCESS FOR THEIR PREPARATION
John A. Edwards, Palo Alto, Calif., and Lawrence H. Knox, Mexico City, Mexico, assignors to Syntex Corporation, Panama, Panama, a corporation of Panama
No Drawing. Continuation of application Ser. No. 514,139, Dec. 15, 1965. This application Sept. 13, 1967, Ser. No. 667,606
Int. Cl. C07c *173/00, 169/14*
U.S. Cl. 260—397.4
22 Claims

ABSTRACT OF THE DISCLOSURE

17-α-dihalocyclopropyl, -dihalocyclopropenyl, and -oxocyclopropyl steroids of the androstane and 19-nor androstane series having progestational activity.

---

This is a continuation of application Ser. No. 514,139, filed Dec. 15, 1965, now abandoned.

This invention relates to novel steroids and to processes for their preparation. Specifically this invention is directed at steroids of the formula:

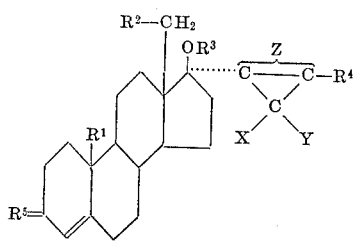

wherein:

each of $R^1$ and $R^2$ is hydrogen or methyl;
$R^3$ is hydrogen, tetrahydropyranyl, or a hydrocarbon carboxylic acyl group;
$R^4$ is hydrogen, methyl, or chloro;
$R^5$ is an oxygen atom or the group

in which $R^6$ is hydrogen, tetrahydropyranyl, or a hydrocarbon carboxylic acyl group;
each of X and Y is chloro or fluoro; and
Z is a carbon-carbon double bond or a carbon-carbon single bond.

The hydrocarbon carboxylic acyl and acyloxy groups of the present invention contain less than 12 carbon atoms and may be of a straight, branched, cyclic or cyclicaliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The novel steroids provided by this invention demonstrate progestational activity and are useful in the treatment of various menstrual disorders and in the control and regulation of fertility. They may be administered in the usual pharmaceutical compositions at dosages appropriate for the condition being treated.

These compounds are prepared according to a process which may be represented as follows:

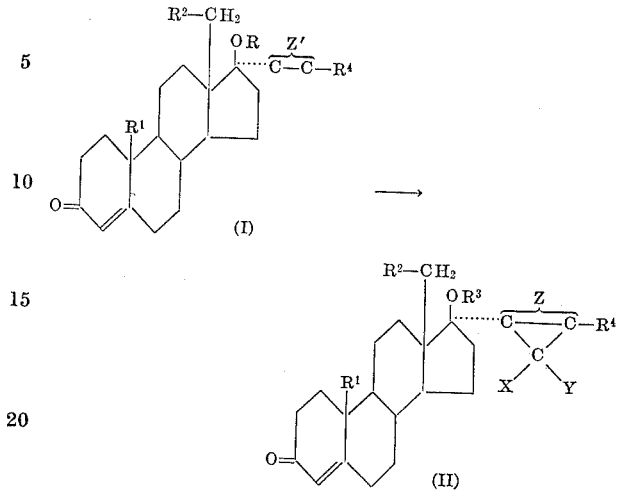

wherein $R^1$, $R^2$, $R^3$, $R^4$, X, Y and Z are as previously defined, and Z' is a carbon-carbon double bond or a carbon-carbon triple bond.

In the practice of the foregoing transformation, a steroid having vinyl, 1-propenyl, chlorovinyl, ethynyl, 1-propynyl or chloroethynyl group in the 17-α-position (I) is treated with a dihalocarbene generated for example from alkali metal salts of haloacetic acid, e.g., sodium trichloroacetate, sodium chlorodifluoroacetate, and sodium dichlorofluoroacetate, to yield the corresponding 17α-dihalocyclopropyl (Z=single bond) or 17α-dihalo-cyclopropenyl (Z=double bond) derivatives of Formula II. The reaction is executed under anhydrous conditions in an inert organic solvent such as diethylene glycol dimethyl ether, triethylene glycol dimethyl ether, or the like. The product forms directly and may be readily separated from the reaction mixture by conventional methods.

The requisite starting material of Formula I wherein Z' is a triple bond is readily prepared from the corresponding 17-keto compound through conventional methods, e.g., treatment with acetylene and potassium-t-butoxide, use of dichloroethylene and methyl lithium, use of alkynyl magnesium halides and the like. The starting materials wherein Z' is a double bond are preferably obtained from the corresponding 17α-alkynyl compounds through controlled hydrogenation according to conventional procedures.

The resulting 17β-hydroxy-17α-alkenyl or 17β-hydroxy-17α-alkynyl compounds may be converted to the corresponding 17β-acyloxy or 17β-tetrahydropyranyloxy derivatives via conventional methods as through the use of an acid anhydride and p-toluenesulfonic acid in acid, or through the use of dihydropyran and an acid catalyst, respectively, prior to practicing the process of this invention or may be subjected thereto directly and, if desired, esterified or etherified thereafter.

The 3-keto compounds may be reduced with sodium borohydride, lithium aluminum tri(t-butoxide) hydride, or the like, after introduction of the 17α-alkenyl or alkynyl substituted and the resulting 3-β-hydroxy compound may then be selectively eitherified with dihydropyran in the presence of p-toluenesulfonyl chloride or may be selectively esterified with an acid anhydride in pyridine.

In addition to the foregoing biological properties, the compounds of the present invention also serve as intermediates for the preparation of other novel progestational agents. Thus, treatment of a 17α-dihalocyclopropyl compound of the present invention with magnesium yields the corresponding 17α-propadienyl derivative. This transformation may be represented as follows:

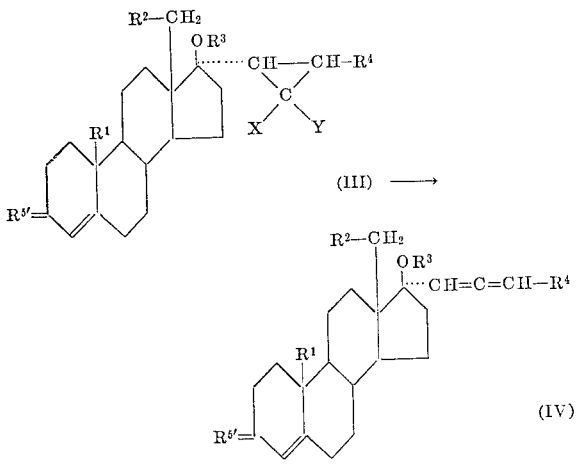

In the foregoing, R¹, R², R³ and R⁴ are as previously defined and R⁵′ is keto or (α-hydrogen, β-acyloxy). In the latter case, this 3-acyloxy group may be hydrolyzed under alkaline conditions and thereafter converted to the tetrahydropyranyl ether with dihydropyran as described above. In the conversion of compounds of Formula III to those of Formula IV, X and Y are preferably chloro. In addition, 17α-(2′,2′-dibromocyclopropyl) compounds of Formula III [X and Y=bromo] may also be converted by the action of magnesium to the same 17α-propadienyl derivatives. Such 17α-dibromocyclopropyl groups are readily obtained through the action of bromoform and potassium t-butoxide on a 17α-vinyl compound of Formula I [Z′=carbon-carbon double bond].

Acidic hydrolysis of the 17α-dihalocyclopropenyl derivatives of the present invention yield the corresponding 17α-cyclopropenones. These transformations may be represented as follows:

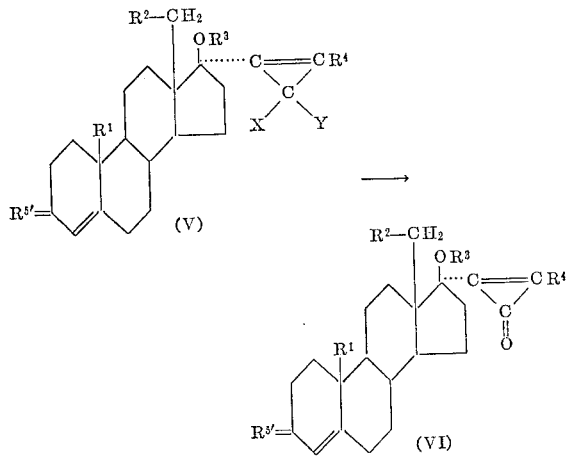

In the foregoing, R¹, R², R³ and R⁴ are as previously defined while the group R⁵′ is keto or acyloxy, as previously described, and the latter may be converted to the corresponding 3β-hydroxy and 3β-tetrahydropyranyloxy compounds in the manner already described.

As previously indicated, compounds of Formula IV and Formula VI are progestational agents which may be used in the same fashion as the halocyclopropyl and halocyclopropenyl compounds of the present invention.

The following examples will serve to further typify the nature of this invention but should not be construed as a limitation thereof.

EXAMPLE 1

To a refluxing solution of 1 g. of 17α-vinylestr-4-en-17β-ol-3-one in 10 ml. of dimethyldiethylene glycol ether is added over a two hour period in a dropwise fashion with stirring, a solution of 35 equivalents of sodium trichloroacetate in 40 ml. of dimethyldiethylene glycol ether. After refluxing for additional hours, the mixture is filtered. The filtrate is evaporated to dryness and the residue is chromatographed on alumina, eluting with methylene chloride, to yield 17α-(2,2-dichlorocyclopropyl)-estr-4-en-17β-ol-3-one.

In a like fashion, 17α-vinyl-18-methylestr-4-en-17β-ol-3-one and 17α-vinylandrost-4-en-17β-ol are subjected to the foregoing procedure to yield 17α-(2,2-dichlorocyclopropyl)-18-methylestr-4-en-17β-ol-3-one and 17α-(2,2-dichlorocyclopropyl)-androst - 4 - en-17β-ol-3-one, respectively.

By use of sodium chlorodifluoroacetate in the foregoing procedure, there is obtained, respectively, 17α-(2,2-difluorocyclopropyl)-estr - 4 - en-17β-ol-3-one; 17α-(2,2-difluorocyclopropyl) - 18 - methylestr-4-en-17β-ol-3-one and 17α-(2,2-difluorocyclopropyl)-androst-4-en-17β-ol-3-one.

The corresponding 17β-acyloxy deivtives, e.g., acetoxy, may be alternatively used in the foregoing procedure, the products thus obtained being similarly esterified. These esters may be obtained in the following manner.

A mixture of 1 g. of 17α-vinyl-18-methylestr-4-en-17β-ol-3-one, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 17α-vinyl-17β-acetoxy-18-methylestr-4-en-17β-ol-3-one which is recrystallized from acetone:ether.

17α-ethynyl-17β-acetoxy-18-methylestr-4-en-3-one is obtained in a similar fashion.

EXAMPLE 2

To a solution of 5.0 g. of 17α-ethynyl-17β-acetoxyestr-4-en-3-one in 75 ml. of dry diethylene glycol dimethyl ether is added 4.36 g. of sodium chlorodifluoroacetate. The mixture is heated at reflux for 15 minutes, cooled and an additional 4.36 g. of sodium chlorofluoroacetate are added and refluxing is continued for 15 more minutes. This procedure is repeated until 17.32 g. of salt have been added. The mixture is then filtered and concentrated in vacuo. The residue is then chromatographed on Florisil absorbent, eluting with ether, to yield (2′,2′-difluorocyclopropenyl)-17β-acetoxyestr-4-en-3-one which is recrystallized from methanol.

In a similar fashion, 17α-(2′,2′-difluorocyclopropenyl)-17β-acetoxy-18-methylestr-4-en-3-one and 17α-(2′,2′-difluorocyclopropenyl)-17β-acetoxyandrost-4-en-3-one are obtained from the corresponding starting materials.

Alternatively, the corresponding free 17β-hydroxy compounds of the three foregoing starting materials may be employed in this procedure to yield 17α-(2′,2′-difluorocyclopropenyl)-estr-4-en-17β-ol-3-one, 17α-(2′,2′-difluorocyclopropenyl)-18-methylestr-4-en-17β-ol-3-one and 17α-(2′,2′ - difluorocyclopropenyl)-androst-4-en-17β-ol-3-one and, if desired these may be acylated, as for example in the manner described in the penultimate paragraph of Example 1.

EXAMPLE 3

By subjecting 17α-chloroethynyl-17β-acetoxyandrost-4-en-3-one to the procedure of Example 2, there is obtained 17α - (2′,2′-difluoro-3′-chlorocyclopropenyl)-17β-acetoxyandrost-4-en-3-one. Likewise from 17α-(1-propynyl)-17β-acetoxyandrost-4-en-3-one there is obtained 17α-(2′,2′-difluoro-3′-methylcyclopropenyl) - 17β - acetoxyandrost-4-en-3-one.

EXAMPLE 4

By employing sodium trichloroacetate in the procedure of Example 2, there are respectively obtained 17α-(2',2'-dichlorocyclopropenyl)-17β-acetoxyestr-4-en-3-one; 17α-(2',2'-dichlorocyclopropenyl) - 17α - acetoxy-18-methyl-estr-4-en-3-one and 17α - (2',2'-dichlorocyclopropenyl)-androst-4-en-3-one.

EXAMPLE 5

Two milliliters of dihydropyran are added to a solution of 1 g. of 17α-(2',2'-difluorocyclopropyl)-ester-4-en-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 17α-(2',2'-difluorocyclopropyl)-17β-tetrahydropyranyloxy-estr-4-en-3-one which is recrystallized from pentane.

Use of this process with other 17β-hydroxy compounds of the present invention will similarly yield the corresponding 17β-tetrahydropyranyloxy derivatives.

EXAMPLE 6

A solution of 1 g. of sodium borohydride in 3 ml. of water is added to an ice-cooled solution of 1 g. of 17α-(2',2'-dichlorocyclopropyl)-ester-4-en-17β-ol-3-one in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 17α-(2',2'-dichlorocyclopropyl)-estr-4-ene-3β,17β-diol which may be further purified by recrystallization from acetone:hexane.

The foregoing procedure is employed to prepare other 3β-hydroxy derivatives of the present invention, as for example 17α-(2',2'-difluorocyclopropenyl)-estr-4-ene-3β,17β-diol; 17α(2',2'-difluorocyclopropenyl)-18-methylestr-4-ene - 3β,17β - diol; 17α-(2',2'-difluorocyclopropenyl)-androst-4-ene-3β,17β-diol; 17α - (2',2'-difluorocyclopropenyl)-17β-acetoxy-18-methylestr-4-en-3β-ol; 17α-(2',2'-difluorocyclopropenyl) - 17β - acetoxyestr-4-en-3β-ol; and 17α-(2',2'-difluorocyclopropenyl) - 17β - acetoxyandrost-4-en-3β-ol.

EXAMPLE 7

A mixture of 1 g. of 17α-(2',2'-dichlorocyclopropyl)-estr-4-ene-3β,17β-diol, 4 ml. of pyridine and 2 ml. of acetic anhydride is allowed to stand at room temperature for 15 hours. The mixture is then poured into ice water and the solid which forms is collected by filtration, washed with water and dried to yield 3β-acetoxy-17α-(2',2'-dichlorocyclopropyl)-estr-4-en-17β-ol which may be further purified through recrystallization from acetone:hexane.

In a similar manner, the other 3β-hydroxy compounds of the present invention may be converted to the corresponding 3β-acetoxy derivatives, as for example 3β-acetoxy-(2',2'-difluorocyclopropenyl)-estr-4-en-17β-ol. Alternatively, through the use of other anhydrides in the foregoing procedures, the corresponding 3β-acylates are prepared.

EXAMPLE 8

Two milliliters of dihydropyran are added to a solution of 1 g. of 17α-(2',2'-difluorocyclopropenyl)-17β-acetoxy-18-methyl-estr-4-en-3β-ol in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane to yield 3β-tetrahydropyranyloxy-17α-(2',2'-difluorocyclopropenyl) - 17β - acetoxy-18-methylestr-4-ene which is recrystallized from pentane.

A solution of 0.17 g. of potassium hydroxide in 0.2 ml. of water and 2.5 ml. of methanol is added over 30 minutes to a refluxing solution of 1 g. of 3β-tetrahydropyranyloxy - 17α - (2',2' - difluorocyclopropenyl)-17β-acetoxy-18-methylestr-4-ene in 30 ml. of methanol under nitrogen. The solution is refluxed for 2 hours, cooled, neutralized with acetic acid and concentrated under reduced pressure. After the addition of water, the solid which forms is collected by filtration and dried to yield 3β-tetrahydropyranyloxy - 17α - (2',2'-difluorocyclopropenyl)-18-methylestr-4-en-17β-ol which is recrystallized from acetone:hexane.

EXAMPLE 9

To a refluxing solution of 1 g. of 17α-(2',2'-dichlorocyclopropyl)-estr-4-en-17β-ol-3-one, 1.3 g. of magnesium shavings, and 25 ml. of anhydrous ether are added over a one hour period of 5.7 g. of ethyl bromide. When the addition is complete, the reaction mixture is refluxed an additional hour and then cautiously hydrolyzed by a dropwise addition of water, followed by 10 percent hydrochloric acid. The ether layer is separated, dried and evaporated to give 17α-propadienylestr-4-en-17β-ol-3-one.

By likewise subjecting the other 17α-(2',2'-dihalocyclopropyl) derivatives of the present invention to the procedure of this example, the corresponding 17α-propadienyl derivatives are obtained.

EXAMPLE 10

To 3.2 ml. of cold (0°) concentrated hydrochloric acid is added with stirring, 0.1 g. of 17α-(2',2'-difluorocyclopropenyl)-17β-acetoxyester-4-en-3-one. The mixture is stirred until the steroid is completely dissolved, then stirred for one additional minute, and finally poured into a mixture of aqueous sodium bicarbonate and ethyl acetate. The organic layer is separated and the aqueous phase extracted with ethyl acetate. The combined organic solutions are then washed with water to neutrality, dried over sodium sulfate and evaporated to dryness to yield 17α-oxocyclopropenyl-17β-acetoxyestr-4-en-3-one which may be further purified through recrystallization from methanol.

In a similar fashion there is prepared according to the foregoing procedure,

17α-oxocyclopropenyl-17β-acetoxy-18-methylestr-4-en-3-one,
17α-oxocyclopropenyl-17β-acetoxyandrost-4-en-3-one,
17α-oxocyclopropenylestr-4-en-17β-ol-3-one,
17α-oxocyclopropenyl-18-methylestr-4-en-17β-ol-3-one,
17α-oxocyclopropenylandrost-4-en-17β-ol-3-one,
3β-acetoxy-17α-oxocyclopropenylestr-4-en-17β-ol,
3β-acetoxy-17α-oxocyclopropenyl-18-methylestr-4-en-17β-ol;
3β-acetoxy-17α-oxocyclopropenylandrost-4-en-17β-ol,
17α-(2-oxo-3-methylcyclopropenyl)-17β-acetoxy-androst-4-en-3-one,
17α-oxocyclopropenyl-17β-acetoxy-18-methylestr-4-en-3β-ol,
17α-oxocyclopropenyl-17β-acetoxyestr-4-en-3β-ol, and
17α-oxocyclopropenyl-17β-acetoxyandrost-4-en-3β-ol.

EXAMPLE 11

One gram of 3β-acetoxy-17α-oxocyclopropenylestr - 4-en-17β-ol is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17α-oxocyclopropenylestr-4-ene-3β,17β-diol which is collected by filtration and recrystallized from acetone:hexane.

EXAMPLE 12

Two milliliters of dihydropyran are added to a solution of 1 g. of 17α-oxocyclopropenyl-17β-acetoxy-18-methylestr-4-en-3β-ol in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-tetrahydropyranyloxy-17α-oxocyclopropenyl-17β-acetoxy-18-methylestr-4-ene which is recrystallized from pentane.

A solution of 0.17 g. of potassium hydroxide in 0.2 ml. of water and 2.5 ml. of methanol is added over 30 minutes to a refluxing solution of 1 g. of 3β-tetrahydropyranyloxy-17β-oxocyclopropenyl-17β-acetoxy-18-methylestr-4-ene in 30 ml. of methanol under nitrogen. The solution is refluxed for 2 hours, cooled, neutralized with acetic acid and concentrated under reduced pressure. After the addition of water, the solid which forms is collected by filtration and dried to yield 3β-tetrahydropyranyloxy-17α-oxocyclopropenyl-18-methylestr-4-en-17β-ol which is recrystallized from acetone:hexane.

What is claimed is:
1. Compounds of the formula:

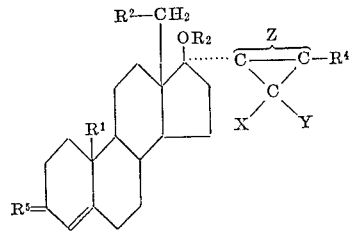

wherein:
$R^1$ is hydrogen or methyl;
$R^2$ is hydrogen or methyl;
$R^3$ is hydrogen, tetrahydropyranyl, or a hydrocarbon carboxylic acyl group of less than 12 carbon atoms;
$R^4$ is hydrogen, chloro or methyl;
$R^5$ is an oxygen atom or the group

in which $R^6$ is hydrogen, tetrahydropyranyl, or a hydrocarbon carboxylic acyl group of less than 12 carbon atoms;
Z is a carbon-carbon single bond or a carbon-carbon double bond; and
each of X and Y is chloro or fluoro.

2. A compound according to claim 1 wherein $R^5$ is an oxygen atom and each of X and Y is fluoro.

3. A compound according to claim 1 wherein $R^5$ is an oxygen atom and each of X and Y is chloro.

4. A compound according to claim 2 wherein, each of $R^1$, $R^2$ and $R^4$ is hydrogen; $R^3$ is acetyl; and Z is a carbon-carbon double bond.

5. A compound according to claim 2 wherein, each of $R^1$ and $R^4$ is hydrogen; $R^2$ is methyl; $R^3$ is acetyl; and Z is a carbon-carbon double bond.

6. A compound according to claim 2 wherein, each of $R^1$, $R^3$ and $R^4$ is hydrogen and Z is a carbon-carbon double bond.

7. A compound according to claim 2 wherein, $R^1$ is methyl; each of $R^2$ and $R^4$ is hydrogen; $R^3$ is acetyl; and Z is a carbon-carbon double bond.

8. A compound according to claim 2 wherein, $R^1$ is methyl; each of $R^2$, $R^3$ and $R^4$ is hydrogen; and Z is a carbon-carbon double bond.

9. A compound according to claim 2 wherein, each of $R^1$, $R^3$ and $R^4$ is hydrogen and Z is a carbon-carbon single bond.

10. A compound according to claim 2 wherein, each of $R^1$ and $R^4$ is hydrogen; $R^3$ is acetyl; and Z is a carbon-carbon single bond.

11. A compound according to claim 2 wherein, $R^1$ is methyl; each of $R^2$, $R^3$ and $R^4$ is hydrogen; and Z is a carbon-carbon single bond.

12. A compound according to claim 2 wherein, $R^1$ is methyl; each of $R^2$ and $R^4$ is hydrogen; $R^3$ is acetyl; and Z is a carbon-carbon single bond.

13. A compound according to claim 3 wherein each of $R^1$ and $R^4$ is hydrogen and $R^3$ is acetyl.

14. A compound according to claim 3 wherein each of $R^1$, $R^3$ and $R^4$ is hydrogen.

15. A compound according to claim 3 wherein, $R^1$ is methyl; each of $R^2$ and $R^4$ is hydrogen; and $R^3$ is acetyl.

16. A compound according to claim 3 wherein, $R^1$ is methyl and each of $R^2$, $R^3$ and $R^4$ is hydrogen.

17. Compounds of the formula:

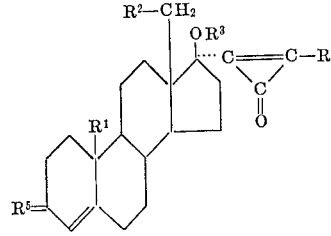

wherein:
$R^1$ is hydrogen or methyl;
$R^2$ is hydrogen or methyl;
$R^3$ is hydrogen, tetrahydropyranyl or a hydrocarbon carboxylic acyl group of less than 12 carbon atoms;
$R^4$ is hydrogen, methyl or chloro; and
$R^5$ is an oxygen atom or the group

in which $R^6$ is hydrogen, tetrahydropranyl or a hydrocarbon carboxylic acyl group of less than 12 carbon atoms.

18. A compound according to claim 17 wherein $R^5$ is an oxygen atom.

19. A compound according to claim 18 wherein, each of $R^1$, $R^3$ and $R^4$ is hydrogen.

20. A compound according to claim 18 wherein, each of $R^1$ and $R^4$ is hydrogen and $R^3$ is acetyl.

21. A compound according to claim 18 wherein, $R^1$ is methyl and each of $R^2$, $R^3$ and $R^4$ is hydrogen.

22. A compound according to claim 18 wherein, $R^1$ is methyl; each of $R^2$ and $R^4$ is hydrogen and $R^3$ is acetyl.

References Cited

UNITED STATES PATENTS 3,357,973  12/1967  Beard et al.

LEWIS GOTTS, *Primary Examiner.*

E. G. LOVE, *Assistant Examiner.*

U.S. Cl. X.R.

260—239.55, 397.5, 999

UNITED STATES PATENT OFFICE
CERTIFICATE OF CORRECTION

Patent No. 3,435,056                                                                 March 25, 1969

John A. Edwards et al.

It is certified that error appears in the above identified patent and that said Letters Patent are hereby corrected as shown below:

Column 7, lines 30 to 39, the formula should appear as shown below:

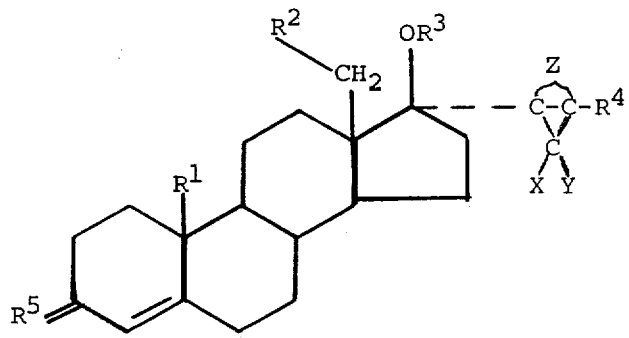

Signed and sealed this 14th day of April 1970.

(SEAL)
Attest:

EDWARD M. FLETCHER, JR.                               WILLIAM E. SCHUYLER, JR
Attesting Officer                                            Commissioner of Patents